United States Patent [19]

Laurén et al.

[11] Patent Number: 5,123,941
[45] Date of Patent: Jun. 23, 1992

[54] APPARATUS FOR PRODUCING MINERAL WOOL

[75] Inventors: Henning J. E. Laurén, Pargas; Peter A. H. Solin, Piispanristi, both of Finland

[73] Assignee: Oy Partek AB, Parainen, Finland

[21] Appl. No.: 659,376

[22] PCT Filed: Aug. 25, 1989

[86] PCT No.: PCT/FI89/00158
§ 371 Date: Apr. 29, 1991
§ 102(e) Date: Apr. 29, 1991

[87] PCT Pub. No.: WO90/02711
PCT Pub. Date: Mar. 22, 1990

[30] Foreign Application Priority Data

Sep. 2, 1988 [FI] Finland ............................ 884072

[51] Int. Cl.[5] .............................................. C03B 37/04
[52] U.S. Cl. .......................................... 65/15; 65/136; 65/DIG. 4
[58] Field of Search ............... 65/6, 8, 15, 16, 19, 65/134, 135, 136, DIG. 4

[56] References Cited

U.S. PATENT DOCUMENTS

| 4,492,594 | 1/1985 | Curley | 65/134 |
| 4,650,510 | 3/1987 | Tuovinen | 65/8 |
| 4,664,691 | 5/1987 | Debouzie | 65/6 |
| 4,668,271 | 5/1987 | Goode et al. | 65/130 X |
| 4,671,765 | 6/1987 | Tsai | 65/135 X |
| 4,715,877 | 12/1987 | Moisala et al. | 65/15 |
| 4,797,142 | 1/1989 | Jensen | 65/19 X |

Primary Examiner—Robert L. Lindsay
Attorney, Agent, or Firm—Fitch, Even, Tabin & Flannery

[57] ABSTRACT

The present invention relates to a method of producing mineral wool, mineral raw material (2) is introduced into a melting unit (3), preferably a cupola furnace, for heating the mineral raw material in such a manner that molten mineral material (4) is formed on the bottom of the melting unit, whereafter the molten mineral material is discharged from the melting unit, heated further, and introduced along at least one tapping chute (8, 9) into a spinning machine (10) in which the mineral material is converted into fibre form. In order to make the mineral melt homogeneous and to ensure that the high quality of the obtained mineral wool, the method according to the invention is characterized in that said further heating is carried out by heating the molten mineral material (4') by means of electric plasma, the plasma heating being carried out in the tapping chute (9) while the molten mineral material (4') flows in the tapping chute so as to obtain a rapid adjustment of the temperature of the molten mineral material and to introduce the molten mineral material into the spinning machine (10) at an even temperature.

3 Claims, 1 Drawing Sheet

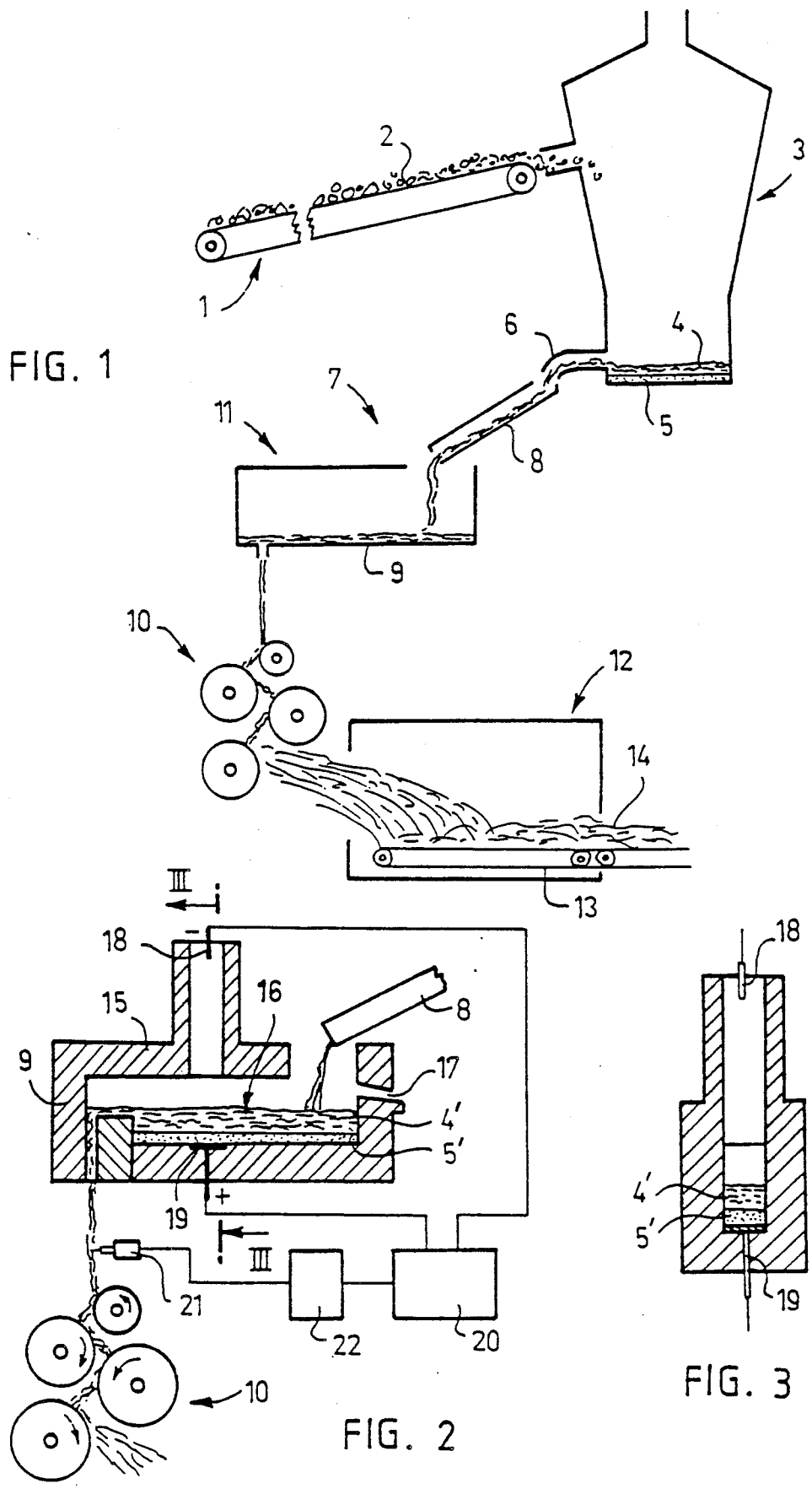

APPARATUS FOR PRODUCING MINERAL WOOL

The present invention relates to a method of producing mineral wool, wherein mineral raw material is introduced into a melting unit, preferably a cupola furnace, for heating the mineral raw material in such a manner that molten mineral material is formed on the bottom of the melting unit, whereafter the molten mineral material is discharged from the melting unit, heated further and introduced along at least one tapping chute into a spinning machine in which the mineral material is converted into fibre form. The invention is also concerned with an apparatus for the production of mineral wool, comprising a feeding device, a melting unit, preferably a cupola furnace, a transport device comprising a tapping chute, an additional heating device and a spinning machine, the feeding device being intended for the supply of mineral raw material into the melting unit, the melting unit for heating the mineral material into molten mineral material, the transport device for transporting the molten mineral material from the melting unit to the spinning machine, the additional heating device for further heating the molten mineral material from the melting unit prior to its introduction into the spinning machine, and the spinning machine being intended for producing mineral material in fibre form.

In the production of mineral wool it is important that the molten material to be introduced into the spinning machine is homogeneous, which requires that the melt should have accurately defined temperature and viscosity as well as a composition such that it is formed into fibres of desired length and thickness in the spinning machine. In practice, even and homogeneous raw materials are used in an attempt to achieve a homogeneous melt, whereby the viscosity of the melt depends on temperature which should kept as even as possible.

The cupola furnace, which is the most frequently used melting unit in the production of mineral wool, does not, however, melt the raw material evenly, which is partly due to the fact that the melt stays only about two minutes on an average on the furnace bottom before it is discharged from the furnace. Therefore it is not possible to obtain a homogeneous melt in the cupola furnace, which, however, is necessary for carrying out the spinning operation successfully. It is even more difficult to obtain a constant temperature in the melt before its introduction into the furnace since so called iron tappings have to be carried out intermittently during the process and since the molten mineral material cools when it flows in the tapping chute between the cupola furnace and the spinning machine. The cooling affects adversely the fibre formation properties of the molten mineral material.

The temperature of the melt from a cupola furnace normally varies from 1400° to 1500° C. with a melt composition of about 60% of $Al_2O_3+SiO_2$. In a normal case, a temperature of about 1460° C. is a preferred operating temperature for spinning.

It is known that instead of trying to at once obtain the right operating temperature, it is usually easier to first melt the material to a lower temperature ranging from 1400° to 1460° C. and then raise the temperature to the required operating temperature by supplying additional energy. This is carried out, e.g., by means of an intermediate container provided with an oil or gas burner, whereby the melt is heated by the hot flame primarily through radiation. However, such an intermediate container has to comprise a heat transfer surface of several square meters to be able to raise the temperature of 5 tons of melt by 100° C. in one hour.

FI Patent Application 2943/68 discloses the use of an intermediate container connected between a spinning machine and a furnace in which the mineral material is to be melted. The intermediate container comprises an electrode furnace and its function is to eliminate variations in the composition of the mineral material. A problem with the intermediate container is that it has to possess a high capacity in order to be able to compensate for variations in the composition of the molten mineral material. High capacity involves large size, which is not only undesirable as such but also results in great heat losses to the surroundings in practice. The intermediate container is therefore expensive to manufacture and maintain. Since the intermediate container is formed by a conventional electrode furnace, the temperature of the molten material cannot be adjusted sufficiently rapidly to be able to introduce mineral melt at an even temperature into the spinning machine, thus ensuring the high quality of the final product.

FI Patent Specification 41435 discloses production of mineral wool. This prior art method uses an intermediate container comprising a channel-type induction furnace with a capacity many times greater than that of the melting furnace. The channel-type conduction furnace is heated by means of an inductor unit which allows the molten material to be mixed. In practice, this prior art method has the same problems as the apparatus of FI Patent Application 2943/68.

U.S. Pat. No. 4,715,877, granted Dec. 29, 1987, to Moisala et al., which corresponds to SE Patent Specification 8504074-9, publication number 451714, describes a burner the function of which is to prevent the solidification and accumulation of material in the tapping chute between the cupola furnace and the spinning machine. This burner, which heats the material stream, is arranged at the opening of the tapping chute.

U.S. Pat. No. 4,797,142, granted Jan. 10, 1989, to Jensen, which corresponds to FI Patent Application 880135 discloses a method of producing mineral wool. The method uses a shaft furnace in which the mineral material is melted by plasma heating. Since the plasma heating is effected within the shaft furnace, high local temperatures in the furnace cause the following problems: First, despite the plasma heating, the temperature of the molten mineral material cannot be adjusted sufficiently rapidly if a rapid adjustment is needed due to, e.g., greater variations in the composition and physical properties (size and shape) of the fed mineral material. Second, greater amounts of nitrogen oxides are formed, which is undesirable and/or unallowed from the environmental point of view and therefore the method requires an expensive gas purification plant. Third, the method does not allow for efficient recovery of the iron oxides contained in the mineral raw material.

The present invention, which solves the problems associated with the production of mineral wool by prior art methods, especially in connection with production carried out by means of a cupola furnace, is concerned with a method and an apparatus for economical production of high-quality mineral wool. The method is mainly characterized in that said further heating is carried out by heating the molten mineral material by means of electric plasma, the plasma heating being carried out in the tapping chute while the molten mineral material flows in the tapping chute so as to obtain a rapid adjustment of the temperature of the molten mineral material and to introduce the molten mineral material into the spinning machine at an even temperature. The apparatus according to the invention, in turn, is characterized in that the additional heating device is formed by a plasma heating device arranged in the tapping chute for heating the molten mineral material while it flows in the tapping chute.

The invention is based on the idea that the molten mineral material is heated rapidly by means of electric plasma shortly prior to its introduction into the spinning machine.

One major advantage of the method of the invention is that the molten mineral material is made highly homogeneous so the fibres formed in the spinning machine are of desired shape, that is, they are sufficiently long and have uniform diameter, which ensures the high quality of the final product. The final product so obtained has good, uniform thermal and mechanical properties. Furthermore, no local cooled portions are formed in the molten mineral material, whereby the formation of "pearls" is avoided, which is an advantage in that such pearls are either rejected as waste or they deteriorate or spoil the quality of the final product.

The structure of the apparatus according to the invention is particularly advantageous in that it can be effected substantially by means of standard components. Accordingly, the apparatus can be advantageously realized by modifying existing apparatuses.

In the following the invention will be described in more detail by means of a preferred embodiment with reference to the attached drawing.

BRIEF DESCRIPTION OF THE DRAWINGS

FIG. 1 is a schematic view of the production of mineral wool;

FIG. 2 is an enlarged sectional view of a detail of the apparatus of FIG. 1; and FIG. 3 is a cross-sectional view of the tapping chute shown in FIG. 2 along the line III—III.

FIG. 1 shows schematically the apparatus of the invention for the production of mineral wool. The apparatus comprises a feeding device 1 for introducing mineral raw material 2 into a cupola furnace 3. The mineral raw material 2 is heated in the cupola furnace 3 by burning coke up to a temperature sufficient to form molten mineral material 4 in the bottom of the cupola furnace 3. Iron melt 5 is positioned undermost in the bottom of the cupola furnace. The bottom of the cupola furnace 3 is provided with a tapping spout 6 through which the molten mineral material is transported to a spinning machine generally indicated with the reference numeral 10 via a transport device generally indicated with the reference numeral 7 and comprising two tapping chutes 8 and 9. The transport device 7 is connected to an additional heating device 11 which consists of a plasma heating device. This heats further the molten mineral material prior to its introduction into the spinning machine 10. The spinning machine, which comprises a number of rotating wheels, converts the molten mineral material into thin fibres by means of centrifugal force. In a spinning chamber 12 the thin fibres are sucked against a transport band 13 on which a thick fibre mat 14 is formed. From the spinning chamber 12 the fibre 14 mat is passed into the following process steps: the fibre mat is cured, pressed, and cut into sheets of desired shape, whereafter the sheets are piled and packed.

When the molten mineral material leaves the cupola furnace 3, its temperature is adjusted to about 1400° C., that is, to a value 50° to 70° C. lower that what is desirable at the spinning machine 10. In practice, a temperature adjustment to 1400° C. involves that the temperature of the molten mineral material varies between about 1450° C. and 1300° C. Accordingly, the temperature of the molten mineral material has to be raised by about 20° to 150° C. by means of the plasma device.

The plasma heating device 11, of the TA (Transferred Arc) type, is described in more detail in connection with FIG. 2. The use of the TA type plasma heating device is preferred since it is able to supply great amounts of energy into the molten mineral material within a short time. Temperatures of about 15,000° K. can be obtained between the electrodes in this type of device. The device requires that the material to be heated is electrically conductive, which the molten mineral material is. It appears from FIG. 2 how the plasma device is connected to the tapping chute 9 of the apparatus. Molten mineral material is fed from the tapping chute 8 to the tapping chute 9. The tapping chute 9 is mostly covered by a cover 15 so as to prevent heat losses from the flowing molten mineral material into the surroundings. A covered tapping chute is to be preferred also for the reason that it prevents the molten mineral material from splashing off the tapping chute. The molten mineral material in the tapping chute 9 is indicated with 4' and the iron melt separated from the mineral material with 5'. The tapping chute 9 is thereby provided with a space 16 for the separation of iron drops. In addition, the tapping chute 9 is tiltable and provided with a backwardly directed outlet opening 17 for the discharge of the iron melt 5' so that it will not enter the spinning machine. The plasma heating device 11 is connected to the tapping chute 9 in such a manner that its negative plasma electrode 18 is positioned in the cover 15 above the molten material 4', 5' and the positive electrode 19 is positioned under the molten material in such a manner that it is in direct contact with the iron melt 5'. This connection of the plasma electrodes 18, 19 makes the electrical plasma go through the molten mineral material while it moves, whereby the transfer of heat from the plasma to the molten mineral material is particularly efficient. The temperature of the molten mineral material can be adjusted rapidly by controlling the capacity between the electrodes 18, 19 by means of a plasma energy supply unit 20. The plasma heating device 11 comprises a thermometer 21, such as an optical pyrometer which measures the temperature of the molten mineral material when it emerges from the cupola furnace. The pyrometer 21 is connected to a regulator 22 which, in turn, is connected, with a suitable delay dependent on the melt flow, to the plasma energy supply unit 20. By means of the electric plasma the molten mineral material is heated up to a temperature such that the viscosity of the molten material is improved before it reaches the spinning machine 10. It is to be seen from FIG. 2 that the spinning machine comprises a number of rotating spinning wheels the direction of rotation of which is shown with arrows. Thin mineral fibres are projected from the spinning wheels. These fibres are of even and high quality due to the homogeneity of the molten mineral material obtained by means of the additional plasma heating.

FIG. 3 shows the tapping chute 9 of FIG. 2 as seen along the section III—III.

The invention has been described above with reference to a preferred embodiment. It is to be understood that the invention, however, can be realized in many different ways within the scope of the idea of the invention and the attached claims. The geometry of the tapping chute can, of course, vary. It is further to be noted that the plasma heating device need not necessarily be of the TA type; a plasma device of the NTA (Non Transferred Arc) type can be used as well. This type of plasma provides arc temperatures of about 3000° to 4000° C., which is noticeably less than with the TA type. It is also typical of the NTA type that the plasma is applied to the surface of the molten material only. This involves that the molten material has to be mixed efficiently in order that the heat of transfer would take place efficiently. An advantage of the NTA type is that it does not otherwise put such high requirements on the process. Inert carrier gas is used on applying electric plasma, preferably nitrogen and argon for efficient transport and transfer of plasma energy to the molten mineral material. Irrespective of the type of plasma device, the number of the electrodes as well as their accurate position can vary. The melting unit used in the embodiment described is a cupola furnace, which is to be preferred in the realization of the invention; alternatively, the melting unit can be an electric furnace, for instance.

What is claimed:

1. Apparatus for the production of mineral wool, comprising:

a melting unit for melting mineral raw material, feed means for supplying mineral raw material to said melting unit, a spinning machine for spinning molten mineral into fibre, transport means having a discharge means for transporting molten material from said melting unit and discharging it from said discharge means into said spinning machine, plasma heating means within said transport means for supplying heat to the molten mineral in the transport means, said plasma heating means including a pair of plasma electrodes, one of which is spaced above the molten mineral and the other of which is in electrical contact with the molten mineral, a plasma energy supply unit connected to said electrodes, temperature sensing means for sensing the temperature of the molten mineral entering said spinning machine, and regulator means for regulating said plasma energy supply unit in response to the temperature sensed by said temperature sensing means.

2. Apparatus in accordance with claim 1 wherein said electrode spaced above the molten mineral is a negative electrode.

3. Apparatus in accordance with claim 1 wherein said transport means is tiltable and includes an outlet spaced from said discharge means for discharging molten iron separated from the molten mineral.

* * * * *